US010377004B2

(12) United States Patent
Yamamoto et al.

(10) Patent No.: US 10,377,004 B2
(45) Date of Patent: Aug. 13, 2019

(54) TOOL MAGAZINE

(71) Applicant: Yamazaki Mazak Corporation, Niwa-gun (JP)

(72) Inventors: Toru Yamamoto, Niwa-gun (JP);
Yasuyuki Hara, Niwa-gun (JP);
Kouichi Shouji, Niwa-gun (JP);
Tetsuya Nakanishi, Niwa-gun (JP);
Reiji Maekawa, Niwa-gun (JP);
Jumpei Kitayama, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 0 days.

(21) Appl. No.: 15/197,769

(22) Filed: Jun. 30, 2016

(65) Prior Publication Data

US 2016/0311075 A1 Oct. 27, 2016

Related U.S. Application Data (63) Continuation of application No. PCT/JP2014/073143, filed on Sep. 3, 2014.

(51) Int. Cl.
*B23Q 3/157* (2006.01)
*B23Q 3/155* (2006.01)

(52) U.S. Cl.
CPC ..... *B23Q 3/15773* (2013.01); *B23Q 3/15536* (2016.11); *B23Q 3/15539* (2016.11);
(Continued)

(58) Field of Classification Search
CPC ............ B23Q 3/15536; B23Q 3/15773; Y10T 483/1748; Y10T 483/1752;
(Continued)

(56) References Cited

U.S. PATENT DOCUMENTS 3,449,822 A * 6/1969 Laumann et al. . B23Q 3/15773
483/43
5,107,581 A * 4/1992 Reuter ............... B23Q 3/15526
483/61
(Continued)

FOREIGN PATENT DOCUMENTS

CN 1206645 2/1999
EP 0319611 6/1989
(Continued)

OTHER PUBLICATIONS

International Preliminary Report on Patentability with Translation of Written Opinion of the International Searching Authority for corresponding International Application No. PCT/JP2014/073143, dated Mar. 7, 2017.
(Continued)

*Primary Examiner* — Erica E Cadugan
*Assistant Examiner* — Michael Vitale
(74) *Attorney, Agent, or Firm* — Mori & Ward, LLP (57) ABSTRACT

A tool magazine includes a magazine arm and a gripper plate. The magazine arm has a tool pot to hold a tool. The magazine arm is pivotable around a pivotal axis such that the tool pot pivots around the pivotal axis. The gripper plate has at least one gripper to hold the tool at a holding position on a circular arc track along which the tool moves when the magazine arm pivots. The at least one gripper is open in a tangent direction of the circular arc track at the holding position.

23 Claims, 7 Drawing Sheets

(52) U.S. Cl.
CPC ............... *B23Q 2003/1553* (2016.11); *B23Q 2003/15527* (2016.11); *B23Q 2003/15531* (2016.11); *B23Q 2003/155418* (2016.11); *B23Q 2003/155428* (2016.11); *B23Q 2003/155446* (2016.11); *Y10T 483/176* (2015.01); *Y10T 483/1771* (2015.01); *Y10T 483/1779* (2015.01); *Y10T 483/1783* (2015.01); *Y10T 483/1809* (2015.01); *Y10T 483/1836* (2015.01); *Y10T 483/1845* (2015.01)

(58) Field of Classification Search
CPC ......... Y10T 483/1755; Y10T 483/1757; Y10T 483/1779; Y10T 483/1781; Y10T 483/1783; Y10T 483/1786; Y10T 483/1788; Y10T 483/1809; Y10T 483/1873; Y10T 483/176
USPC ........ 483/36, 38, 39, 40, 48, 49, 51, 52, 53, 483/59, 66, 41; 20/36, 38, 39, 40, 48, 49, 20/51, 52, 53, 59, 66
See application file for complete search history.

(56) References Cited

U.S. PATENT DOCUMENTS

| | | | |
|---|---|---|---|
| 5,496,249 A | 3/1996 | Buggle et al. | |
| 6,007,464 A | 12/1999 | Hashimoto | |
| 6,142,920 A * | 11/2000 | Ogura | B23Q 3/15526 211/70.6 |
| 6,494,821 B1 * | 12/2002 | Patel | B23Q 3/15513 483/49 |
| 6,949,055 B2 * | 9/2005 | Ferrari | B23Q 1/012 409/202 |
| 7,153,252 B2 * | 12/2006 | Luscher | B23Q 3/15526 211/1.53 |
| 7,250,024 B2 * | 7/2007 | Geissler | B23Q 3/15513 211/1.53 |
| 8,474,117 B2 * | 7/2013 | Kuriya | B23Q 7/10 211/184 |
| 2003/0130101 A1 * | 7/2003 | Hwang | B23Q 3/15553 483/59 |
| 2005/0026758 A1 | 2/2005 | Geissler et al. | |

FOREIGN PATENT DOCUMENTS

| | | |
|---|---|---|
| EP | 0642880 | 3/1995 |
| EP | 1502696 | 2/2005 |
| EP | 2295199 | 3/2011 |
| JP | 62-54638 | 3/1987 |
| JP | 2005-47000 | 2/2005 |

OTHER PUBLICATIONS

International Search Report for corresponding International Application No. PCT/JP2014/073143, dated Sep. 30, 2014.
Extended European Search Report for corresponding EP Application No. 14901172.8-1702, dated Jan. 31, 2017.
Chinese Office Action for corresponding CN Application No. 201480002077.0, dated Jan. 5, 2017.

* cited by examiner

TOOL MAGAZINE

CROSS-REFERENCE TO RELATED APPLICATIONS

The present application is a continuation application of International Application No. PCT/JP2014/073143, filed Sep. 3, 2014. The contents of this application are incorporated herein by reference in their entirety.

BACKGROUND OF THE INVENTION

Field of the Invention

The present invention relates to a tool magazine.

Discussion of the Background

Conventionally, when machine tools such as machining centers perform different kinds of processing using different tools, the tool attached to the spindle is replaced with another tool. Also in such cases as where the tool is damaged during ongoing processing, it is necessary to replace the tool with a new tool.

Such machine tool includes, for example, a tool magazine that stores different types of tools; a transfer mechanism that performs transfer operations of taking out a tool from the tool magazine or of storing a tool in the tool magazine; and an automatic tool changer (ATC) that receives the tool from the transfer mechanism and attaches/detaches the tool to/from the spindle.

As a tool magazine applied to the above-described machine tool, there is a tool magazine that includes, for example, a pair of shelves that are disposed to face each other and provided with a plurality of notches for storing tools; and a handling apparatus that includes a gripper device that holds and transfers the tool. The tool magazine enables the handling apparatus to cause its gripper device to access the notches on the shelves (see, for example, Japanese Unexamined Patent Application Publication No. 2005-047000).

SUMMARY OF THE INVENTION

According to a first aspect of the present invention, a tool magazine includes a magazine arm and a gripper plate. The magazine arm includes a pivotal axis on one end of the magazine arm, and a tool pot on the other end of the magazine arm. The tool pot is configured to hold a tool in a suspended manner. On the gripper plate, a plurality of grippers are disposed in a longitudinal direction of the tool magazine. The gripper is configured to hold the tool in a suspended manner on a circular arc track on which the tool moves when the magazine arm pivots. The gripper is open in a tangent direction of the circular arc at a position where the tool is held.

According to a second aspect of the present invention, a tool magazine includes a magazine arm and a gripper plate. The magazine arm has a tool pot to hold a tool. The magazine arm is pivotable around a pivotal axis such that the tool pot pivots around the pivotal axis. The gripper plate has at least one gripper to hold the tool at a holding position on a circular arc track along which the tool moves when the magazine arm pivots. The at least one gripper is open in a tangent direction of the circular arc track at the holding position.

According to a third aspect of the present invention, a tool magazine includes a magazine arm and a gripper plate. The magazine arm has a tool pot to hold a tool. The magazine arm is pivotable around a pivotal axis such that the tool pot pivots around the pivotal axis. The gripper plate has at least one gripper with an opening to hold the tool in the opening at a holding position on a circular arc track. The tool moves along the circular arc track when the magazine arm pivots. The circular arc track is on a plane perpendicular to the pivotal axis. The opening has a central line which extends on the plane. The central line corresponds to a tangent of the circular arc track at the holding position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

Figure 1:
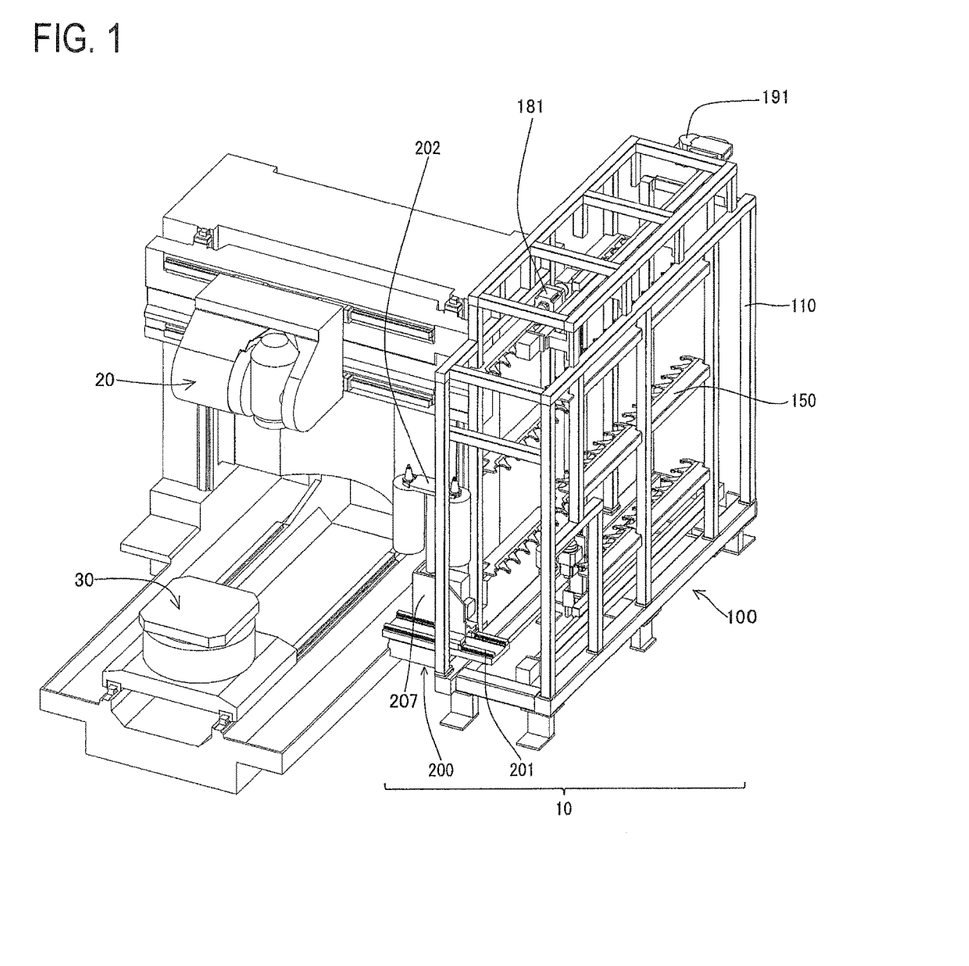
FIG. 1 is a perspective view of a machine tool to which a tool magazine according to the embodiment of the present invention is applied.

FIG. 1 is a perspective view of a machine tool to which a tool magazine according to the embodiment of the present invention is applied. As shown in FIG. 1, a tool magazine 10 according to the embodiment of the present invention is disposed next to a machine that includes a spindle 20 and a work table 30. The tool magazine 10 according to the embodiment of the present invention has generally two areas, namely, a rack area 100 and an automatic tool changer (ATC) area 200. The rack area 100 includes a frame member 110, gripper plates 150, and other elements described later. The ATC area 200 includes an ATC arm 202, an ATC carrier 207, and other elements described later. A controller, not shown, controls motions of the tool magazine 10, the spindle 20, the work table 30, and other elements.

Figure 2:
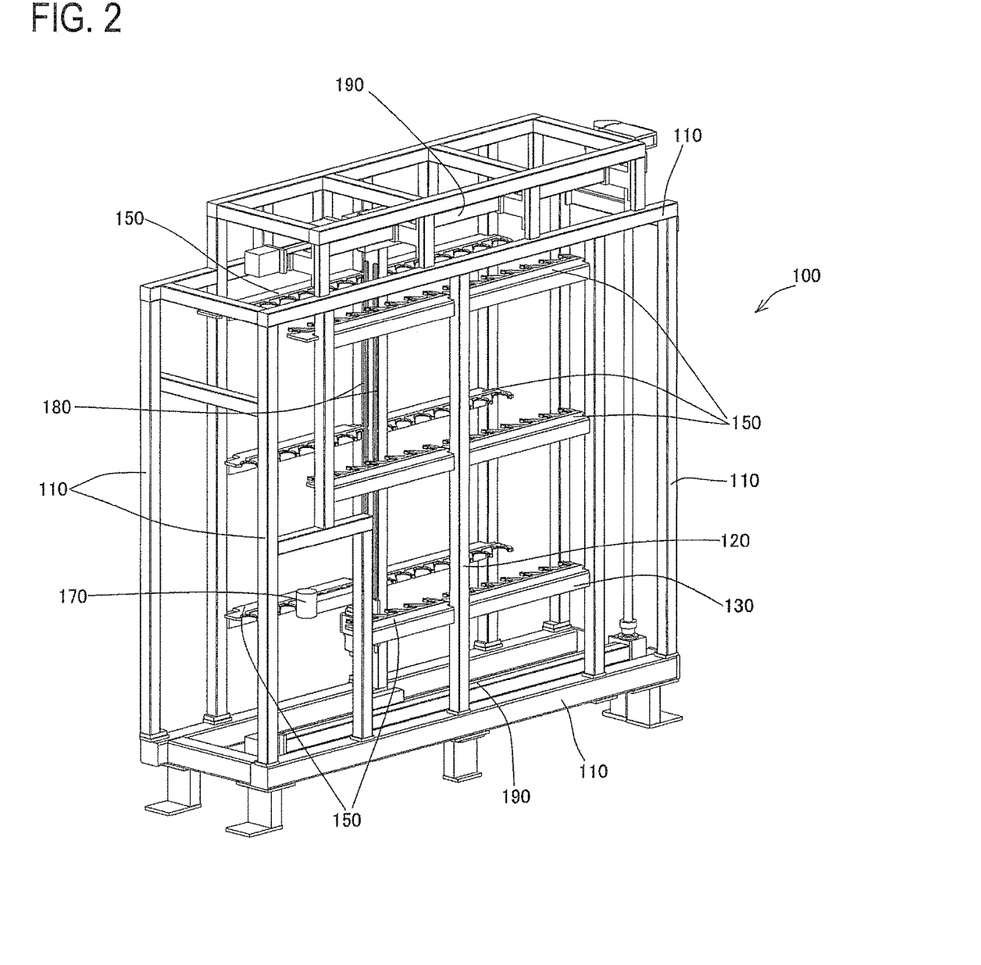
FIG. 2 is a schematic perspective view of a rack area of the tool magazine according to the embodiment of the present invention.

FIG. 2 is a schematic perspective view of the rack area 100 of the tool magazine 10 according to the embodiment of the present invention. As shown in FIG. 2, the rack area 100 of the tool magazine 10 according to the embodiment of the present invention includes the frame member 110, the gripper plates 150, gripper plate mounting sub-frame members 130, sub-frame members 120, a tool holding device 170, vertical guide rails 180, a vertical movement mechanism (see 181 in FIG. 1), a horizontal guide rail 190, and a horizontal movement mechanism (see 191 in FIG. 1). The frame member 110 defines the outer shape of the rack area 100. The gripper plates 150 each include grippers to hold a tool in a suspended manner on a side of each gripper plate 150. The gripper plates 150 are mounted on the respective gripper plate mounting sub-frame members 130. Through the sub-frame members 120, the gripper plate mounting sub-frame members 130 are mounted on the frame member 110. The tool holding device 170 moves the tool held in a suspended manner. The vertical movement mechanism moves the tool holding device 170 in the vertical direction on the vertical guide rails 180. The horizontal movement mechanism moves the vertical guide rails 180 on the horizontal guide rail 190 on a plane parallel to the gripper plates 150. The gripper plates 150 face each other across a plane defined by the vertical guide rails 180 and the horizontal guide rail 190 and are located parallel to the plane. A possible example is that the gripper plates 150 are provided in plural in a longitudinal direction of the sub-frame members 120 (a vertical direction of the rack area 100) to form a multistage structure. The gripper plates 150 are mountable at any desired height of the sub-frame members 120 through the gripper plate mounting sub-frame members 130. An exemplary manner in which the gripper plates 150 are mounted is to insert a T-slot nut (not shown) into a T-slot which is a T groove having a T-shaped cross-section (not shown) formed in the sub-frame members 120, and to secure the gripper plate mounting sub-frame members 130 to the sub-frame members 120 with a blot (not shown) at any desired height. This configuration ensures stepless height adjustment of the gripper plates 150. The gripper plate mounting sub-frame members 130 each may have a length equal to the dimension defined between the sub-frame members 120 disposed on both ends of each gripper plate mounting sub-frame member 130. This configuration keeps the gripper plates 150 horizontal while the gripper plates 150 are moved to change the height of the gripper plates 150. This facilitates adjustment operation of mounting the gripper plates 150. The gripper plates 150 may be mounted on an elevating mechanism that travels along the sub-frame members 120, making the position of the gripper plates 150 adjustable. This configuration further facilitates height adjustment of the gripper plates 150. This may be controlled in combination with the operation of the vertical movement mechanism of the tool holding device 170, which shortens the necessary movement distance and the operation time. When a plurality of gripper plates 150 are provided, the height position of each gripper plate 150 can be changed independently. In other words, the distance between the gripper plates can be changed freely in accordance with the tool length. In view of this, storing short-length tools in the tool magazine in a focused manner at one place makes the number of stages formed by the gripper plates increase and results in increasing the number of tools that can be stored. Additionally increasing the number of the sub-frame members 120 makes it possible to provide a plurality of gripper plates in the horizontal direction. This ensures that the section in which the gripper plate height is adjustable in accordance with the tool length can be divided into a number of sections. This leads to an increased number of tools that can be stored, resulting in more effective utilization of the space of the rack area.

Figure 3:
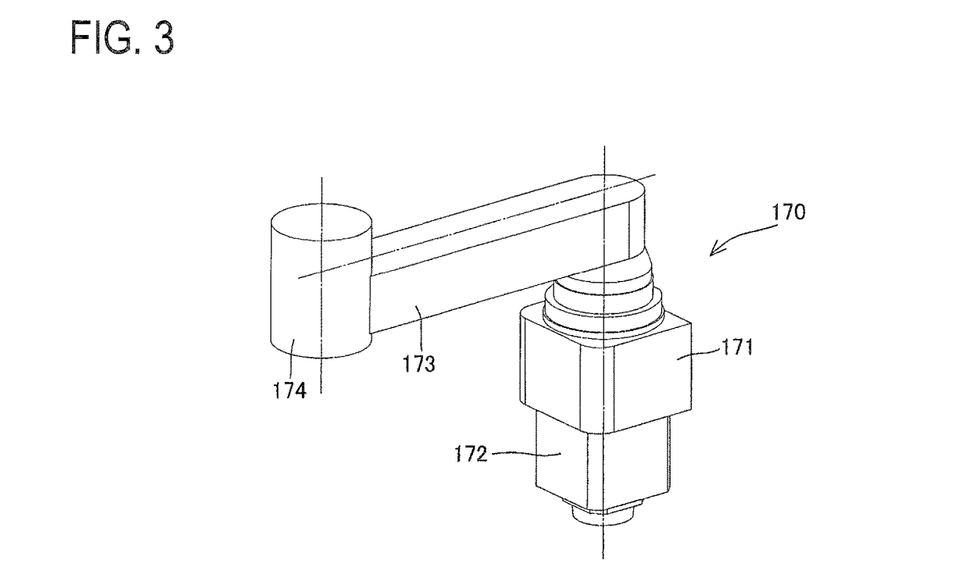
FIG. 3 is a schematic perspective view of a tool holding device applied to the tool magazine according to the embodiment of the present invention.

FIG. 3 is a schematic perspective view of the tool holding device 170 applied to the rack area 100 of the tool magazine 10 according to the embodiment of the present invention. As shown in FIG. 3, the tool holding device 170 applied to the rack area 100 of the tool magazine 10 according to the embodiment of the present invention includes a shifter 171, a magazine arm pivoting mechanism 172, a magazine arm 173, described later, and a tool pot 174. The shifter 171 moves by the guidance of the vertical guide rails 180 in FIG. 2. The magazine arm pivoting mechanism 172 pivots the magazine arm 173 about a predetermined vertical axis provided on the shifter 171. The magazine arm 173 is disposed on the shifter 171. The tool pot 174 is disposed on a distal end of the magazine arm 173 to hold a tool in a suspended manner. In the specific example shown in FIG. 3, the tool pot 174 approaches a taper portion of a tool from above the tool and holds the tool in a suspended manner. Examples of the manner in which the tool pot 174 holds a tool include, but are not limited to, holding the taper portion of the tool from the side using claws. Any other manner is usable insofar as the manner is capable of holding the tool in the vertical direction.

Figure 4:
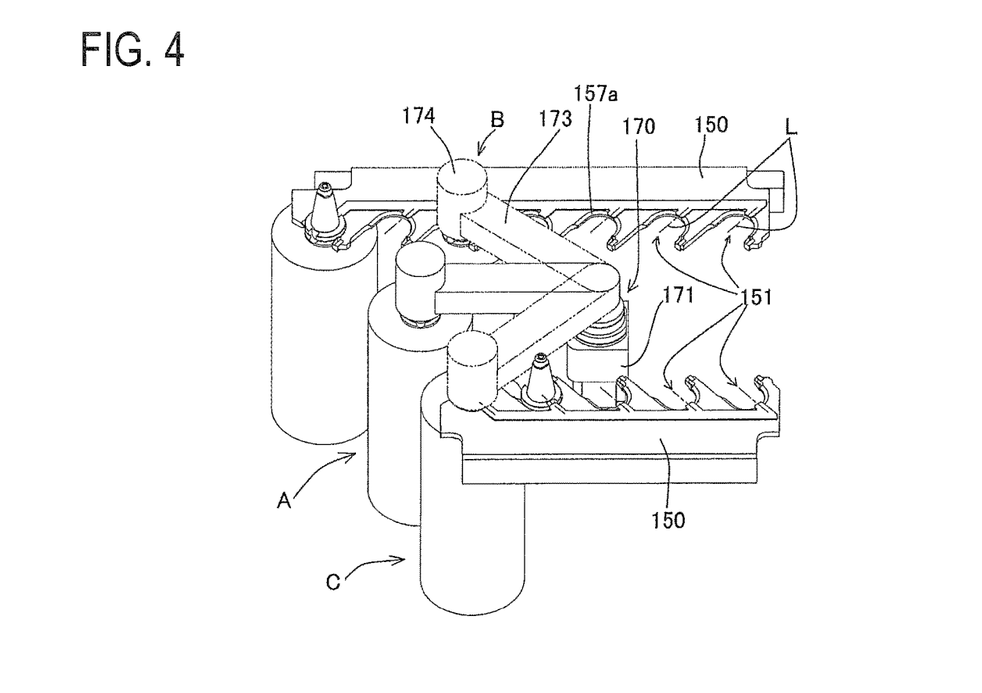
FIG. 4 is a perspective view of main portions of the tool holding device and a gripper plate, illustrating a tool transfer operation between the tool holding device and the gripper plate in the tool magazine according to the embodiment of the present invention.

FIG. 4 is a perspective view of main portions of the tool holding device 170 and the gripper plates 150 in the rack area 100 of the tool magazine 10 according to the embodiment of the present invention, illustrating a tool transfer operation performed between the tool holding device 170 and the gripper plates 150. As shown in FIG. 4, the magazine arm 173 of the tool holding device 170 pivots about a pivotal axis provided in the shifter 171 to place a tool held in a suspended manner by the tool pot 174 in a center position A, a right pivoting position B, or a left pivoting position C. As described above, a pair of gripper plates 150 are disposed to face each other across the tool holding device 170. These gripper plates 150 each include a plurality of grippers 151. The plurality of grippers 151 are open and extend in an oblique direction toward the tool holding device 170. As used herein, the term "oblique direction" in which the grippers 151 of the gripper plates 150 extend refers to a direction indicated by a tangent on a circular arc of a pivoting track that the center of the tool draws when the magazine arm 173 performs a pivoting operation at a position where the tool is stored in the gripper 151. In other words, the tangent corresponds to a center line of the opening of the gripper 151 (see reference character L in FIGS. 4, 7, and 8).

Figure 5A:
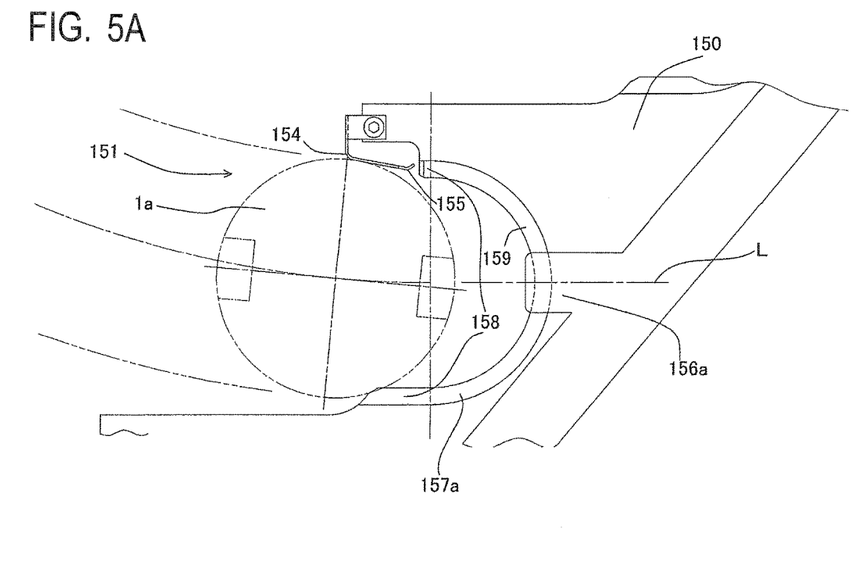
FIG. 5A is a schematic top view of the gripper plate applied to the tool magazine according to the embodiment of the present invention and holding a BT tool at the time of the BT tool in contact with an elastic member (leaf spring)
Figure 5B:
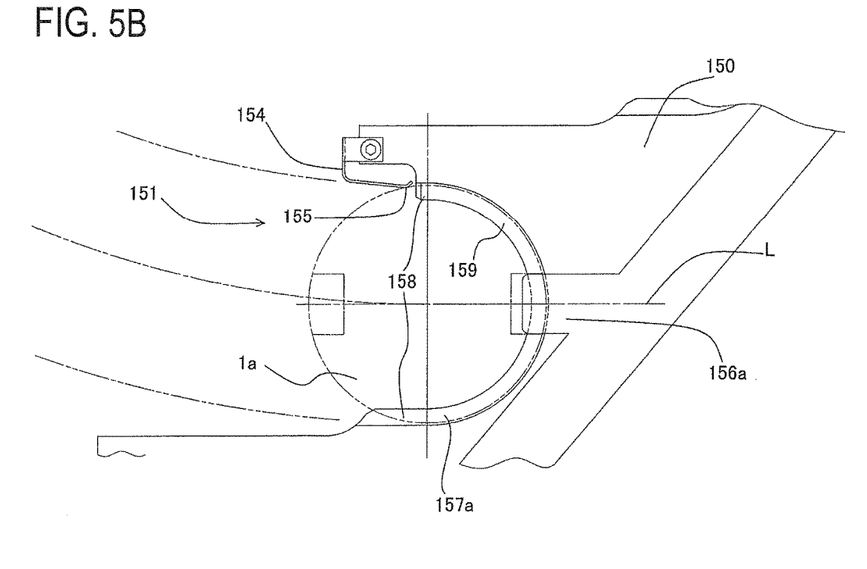
FIG. 5B is a schematic top view of the gripper plate applied to the tool magazine according to the embodiment of the present invention and holding the BT tool at the time of the BT tool completely held within the gripper.

FIGS. 5A and 5B are schematic top views of the gripper plates 150 applied to the rack area 100 of the tool magazine 10 according to the embodiment of the present invention, illustrating the gripper plates 150 holding a BT tool 1a. FIG. 5A shows a state in which the tool 1a is in contact with an elastic member (leaf spring) 154, described later. FIG. 5B shows a state in which the tool 1a is completely held within the gripper 151, so that the tool 1a is pressed and supported by the elastic member (leaf spring) 154. In FIGS. 5A and 5B, the tool pot, which is holding the tool 1a, and the magazine arm are not shown. As shown in FIG. 5A, a tool holding portion 157a of the gripper 151 is capable of holding the BT tool 1a. The tool holding portion 157a is made up of a linear portion 158 and a circular arc portion 159, which are integral to each other. The linear portion 158 guides a V groove portion formed on the outer circumferential surface of the tool 1a when the tool 1a is inserted into the gripper 151. The circular arc portion 159 contacts the V groove portion to hold the tool 1a.

As shown in FIGS. 5A and 5B, the elastic member (leaf spring) 154 is disposed on a distal end of the gripper 151 that is closer to the tool holding device (not shown), that is, disposed on the front side of the tool holding portion 157a. The elastic member (leaf spring) 154 has a fixed end at this distal end of the gripper 151 and a free end on the opposite side. On the free end, the leaf spring 154 has a protrusion portion 155 on the side on which the gripper 151 is open. At the center of the opening angle (center of the circular arc) of the gripper 151, a key 156a is formed centered on a central line L of the opening of the gripper 151. The key 156a engages with a key groove formed on the outer circumferential surface of the tool 1a.

In the case where the gripper 151 holds the tool 1a by the pivoting operation of the magazine arm, the leaf spring 154 on the distal end of the gripper 151 first contacts the outer circumferential surface of the tool 1a as shown in FIG. 5A. When the magazine arm makes further pivoting beyond the contact position, the tool 1a is guided by the linear portion 158 of the tool holding portion 157a of the gripper 151, and the leaf spring 154 is deformed by being pressed away by the outer circumferential surface of the tool 1a. Then, as shown in FIG. 5B, when the tool 1a moves further through the gripper 151, the tool 1a contacts and is supported by the circular arc portion 159 of the tool holding portion 157a of the gripper 151, and the key groove on the outer circumferential surface of the tool 1a engages with the key 156a on the center of the opening angle of the gripper 151. At the same time, the leaf spring 154 returns toward its original position by resilience, causing the protrusion portion 155 of the leaf spring 154 to press and support the outer circumferential surface of the tool 1a. As a result of these operations, the tool 1a engages with the key 156a and thus is prevented from rotating, and the protrusion portion 155 of the leaf spring 154 prevents the tool 1a from coming out of the gripper 151. Thus, the tool 1a is held in a suspended manner, instead of coming out of the gripper 151 and falling. In the case where the tool 1a is removed from the gripper 151, the magazine arm is pivoted in reverse in the holding operations.

Figure 6A:
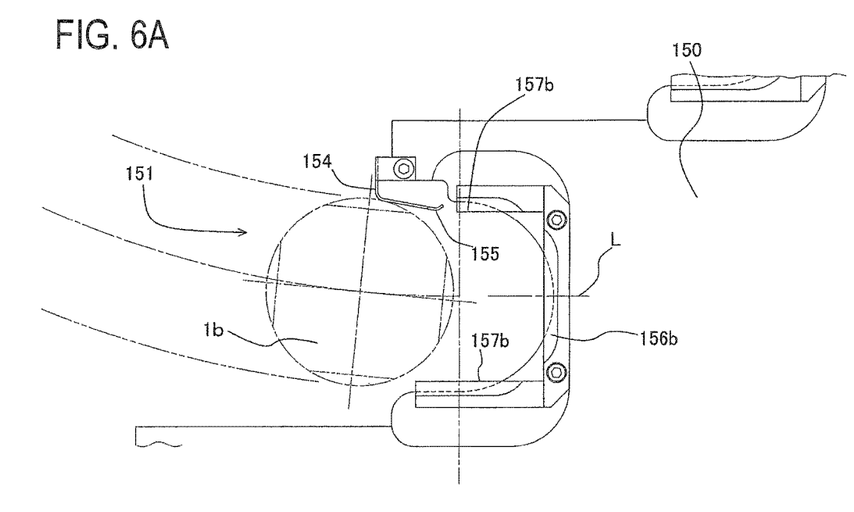
FIG. 6A is a schematic top view of the gripper plate applied to the tool magazine according to the embodiment of the present invention and holding a CAPTO tool at the time of the CAPTO tool in contact with the elastic member (leaf spring)
Figure 6B:
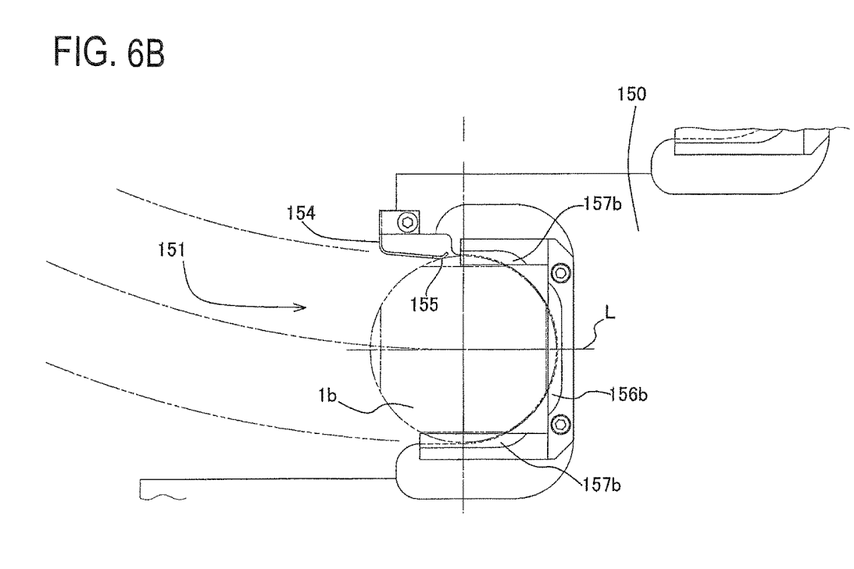
FIG. 6B is a schematic top view of the gripper plate applied to the tool magazine according to the embodiment of the present invention and holding the CAPTO tool at the time of the CAPTO tool completely held within the gripper.

FIGS. 6A and 6B are schematic top views of the gripper plates 150 applied to the rack area 100 of the tool magazine 10 according to the embodiment of the present invention, illustrating the gripper plates 150 holding a "COROMANT CAPTO" tool 1b ("CAPTO" is a registered trademark, which will be hereinafter simply referred to as "CAPTO"). FIG. 6A shows a state in which the tool 1b is in contact with the elastic member (leaf spring) 154. FIG. 6B shows a state in which the tool 1b is completely held within the gripper 151, so that the CAPTO tool 1b is pressed and supported by the elastic member (leaf spring) 154. In FIGS. 6A and 6B, the tool pot, which is holding the tool 1b, and the magazine arm are not shown. As shown in FIG. 6A, a tool holding portion 157b of the gripper 151 is capable of holding the CAPTO tool 1b. The tool holding portion 157b is made up of a pair of plane portions facing each other. The pair of plane portions hold the tool 1b by contacting a pair of notch grooves that are formed on an outer circumferential surface of the tool 1b. In another embodiment, the tool holding portion 157b may be implemented by rollers or similar devices, not shown in FIGS. 6A and 6B, that contact and support the pair of notch grooves that are on the outer circumferential surface of the tool.

As shown in FIGS. 6A and 6B, the elastic member (leaf spring) 154 is disposed on a distal end of the gripper 151 that is closer to the tool holding device (not shown), that is, disposed on the front side of the tool holding portion 157b. The elastic member (leaf spring) 154 has a fixed end at this distal end of the gripper 151 and a free end on the opposite side. On the free end, the leaf spring 154 has a protrusion portion 155 on the side on which the gripper 151 is open. At the center of the opening angle (center of the circular arc) of the gripper 151, a key 156b is formed centered on a central line L of the opening of the gripper 151. The key 156b functions as a rotating stopper by contacting a different notch groove from the above-described pair of notch grooves on the outer circumferential surface of the tool 1b.

In the case where the gripper 151 holds the tool 1b by the pivoting operation of the magazine arm, the leaf spring 154 on the distal end of the gripper 151 first contacts the outer circumferential surface of the tool 1b as shown in FIG. 6A. When the magazine arm makes further pivoting beyond the contact position, the pair of notch grooves on the outer circumferential surface of the tool 1b are guided by the pair of tool holding portions 157b of the gripper 151, which face the pair of notch grooves, and the leaf spring 154 is deformed by being pressed away by the outer circumferential surface of the tool 1b. Then, as shown in FIG. 6B, when the tool 1b moves further through of the gripper 151, the different notch groove on the outer circumferential surface of the tool 1b and the key 156b on the center of the opening angle of the gripper 151 come into surface contact with each other. At the same time, the leaf spring 154 returns toward its original position by resilience, causing the protrusion portion 155 of the leaf spring 154 to press and support the outer circumferential surface of the tool 1b. As a result of these operations, the tool 1b is in surface contact with the key 156b and thus is prevented from rotating, and the protrusion portion 155 of the leaf spring 154 prevents the tool 1b from coming out of the gripper 151. Thus, the tool 1b is held in a suspended manner, instead of coming out of the gripper 151 and falling. In the case where the tool 1b is removed from the gripper 151, the magazine arm is pivoted in reverse in the holding operations.

As shown in FIGS. 4, 5A, 5B, 6A, and 6B, in the rack area 100 of the tool magazine 10 according to the embodiment of the present invention, a tool held by the tool pot 174 attached on the distal end of the magazine arm 173 is transferred to the gripper 151 of the gripper plate 150 by only the pivoting operation of the magazine min 173. This eliminates the need for an additional configuration to maintain the angle and posture of the tool with respect to the magazine arm 173 in response to the pivoting of the magazine arm 173. This simplifies the configuration of the tool holding device 170 including the magazine arm 173 and the tool pot 174. It is also unnecessary to provide a complicated mechanism to change the angle and posture (phase) of the tool, facilitating the control of the tool transfer operation. Furthermore, the opening of the gripper 151 of the gripper plate 150 extends obliquely in the direction of the tangent on the circular arc of the pivoting track that the center of the tool draws when the magazine arm 173 performs the pivoting operation at the position where the tool 1a (or 1b) is stored in the gripper 151. Thus, it is not necessary to provide as much working space as required in another tool magazine equipped with a movement mechanism in a horizontal direction toward the gripper plate. This diminishes the width dimension of the tool magazine. Furthermore, the gripper plates 150 are disposed on both sides of the tool holding device 170 and facing each other across the tool holding device 170. This minimizes the width dimension of the rack area 100 of the tool magazine 10 according to the embodiment of the present invention although a large number of tools can be stored.

Figure 7:
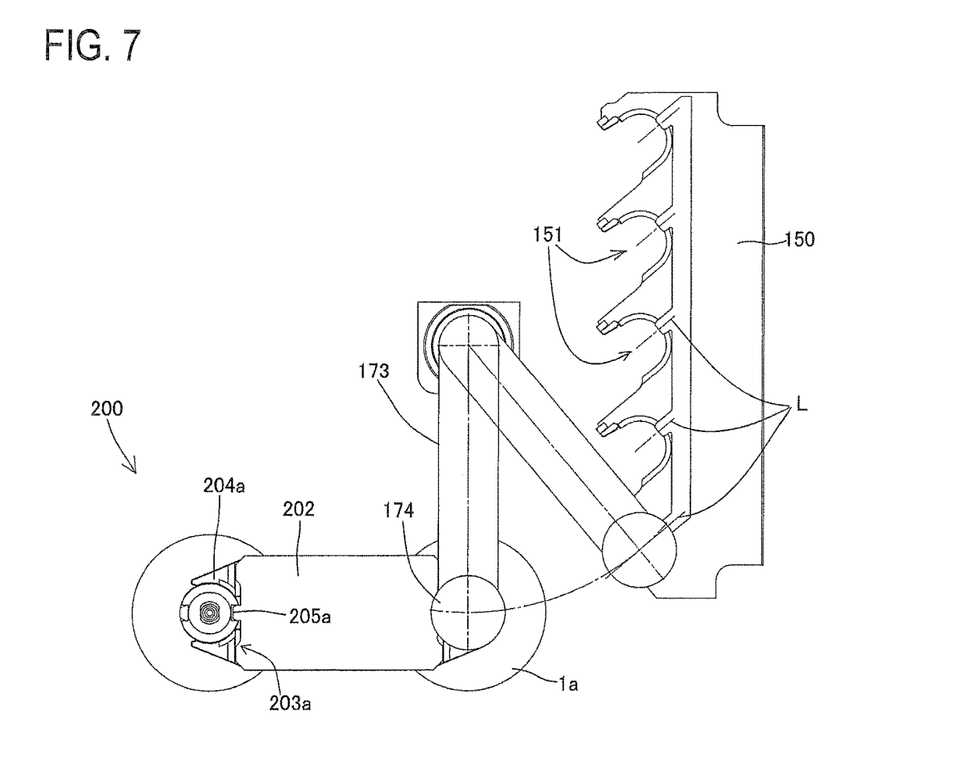
FIG. 7 is a top view of an embodiment of the tool magazine according to the embodiment of the present invention in which an automatic tool changer (ATC) area for the BT tool is provided.

FIG. 7 is a top view of an embodiment of the automatic tool changer (ATC) area 200 for a BT tool of the tool magazine 10 according to the embodiment of the present invention. As shown in FIG. 7, the automatic tool changer (ATC) area 200 of the tool magazine 10 according to the embodiment of the present invention includes guide rails (see 201 in FIG. 1), the ATC carrier (see 207 in FIG. 1), the ATC arm 202, and ATC grippers 203a. The ATC carrier is movable in the horizontal direction on the guide rails 201. The ATC arm 202 rotates horizontally about a rotation center on the ATC carrier. The ATC grippers 203a are disposed on both ends in the longitudinal direction of the ATC arm 202. Each of the ATC grippers 203a includes a pair of supporting claws 204a and an opening and closing mechanism (not shown) for the pair of supporting claws 204a. The pair of supporting claws 204a support a tool by holding between them a V groove formed on the outer circumferential surface of the BT tool. A support portion 205a is formed on a center of a base of the supporting claws 204a of the ATC gripper 203a. The support portion 205a engages with the key groove of the tool 1a. All operations of the machine tool are controlled by the controller (not shown). In the automatic tool changer (ATC) area 200 shown in FIG. 7, the controller executes a transfer operation that includes making the ATC gripper 203a located on the tool magazine side receive the replacement tool 1a from the magazine arm 173, and making the ATC arm 202 rotate by 180 degrees so as to transfer the tool 1a to the tool spindle (see 20 in FIG. 1). The controller also executes a similar transfer operation that includes making the ATC gripper 203a located on the processing side receive the tool 1a removed from the tool spindle, and making the ATC arm 202 rotate by 180 degrees so as to transfer the tool 1a to the tool pot 174 of the magazine arm 173 on the tool magazine side.

In the tool magazine 10, the transfer operation of the replacement tool 1a from the gripper plate 150 to the automatic tool changer (ATC) area 200 is performed in the manner shown in FIG. 7. Specifically, with the magazine arm 173 holding the tool 1a and being left waiting at a center position, the ATC carrier (see 207 in FIG. 1) horizontally moves to cause the ATC gripper 203 a of the ATC arm 202 to hold the V groove on the outer circumferential surface of the tool 1a held by the tool pot 174 of the magazine arm 173. The support portion 205a is located such that the tool 1a is able to be held at the center position of the pivoting track of the magazine arm 173. This ensures that the tool 1a held by the tool pot 174 on the distal end of the magazine arm 173 is transferred to the ATC gripper 203 a only by the horizontal movement of the ATC carrier. This eliminates the need for a complicated mechanism nor control dedicated to changing the angle and posture (phase) of the tool 1a in the transfer of the tool 1a from the gripper plate 150, which stores the tool 1a, to the ATC arm 202 of the automatic tool changer (ATC) area 200. This facilitates the control of the tool transfer operation.

Figure 8:
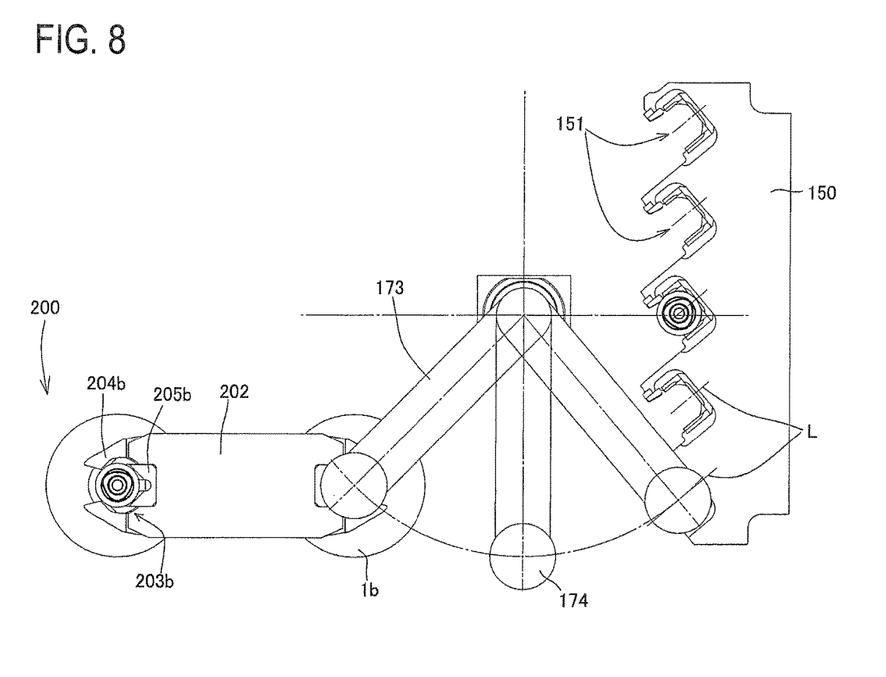
FIG. 8 is a top view of an embodiment of the tool magazine according to the embodiment of the present invention in which an automatic tool changer (ATC) area for the CAPTO tool is provided.

FIG. 8 is a top view of an embodiment of the automatic tool changer (ATC) area 200 for a CAPTO tool of the tool magazine 10 according to the embodiment of the present invention. As shown in FIG. 8, the automatic tool changer (ATC) area 200 for the CAPTO tool has a similar configuration to the automatic tool changer (ATC) area 200 for the BT tool shown in FIG. 7. In this regard, ATC grippers 203b are disposed on both ends in the longitudinal direction of the ATC arm 202, and each include a pair of supporting claws 204b and an opening and closing mechanism (not shown) for the pair of supporting claws 204b. The pair of supporting claws 204b respectively contact and support notch grooves on two adjacent sides formed on the outer circumferential surface of the CAPTO tool. A support portion 205b is formed on a center of a base of the pair of supporting claws 204b of the ATC gripper 203b. The support portion 205b is in surface contact with notch grooves on two adjacent sides respectively disposed on sides 180-degree opposite to the notch grooves on the above-described two adjacent sides.

In the tool magazine 10, the transfer operation of the replacement tool 1b from the gripper plate 150 to the automatic tool changer (ATC) area 200 is performed in the manner shown in FIG. 8. Specifically, with the magazine arm 173 holding the tool 1b and being left waiting at a position pivoted by 45 degrees from the center position, the ATC carrier (see 207 in FIG. 1) horizontally moves to cause the ATC gripper 203b of the ATC arm 202 to hold the notch grooves on the outer circumferential surface of the tool 1b held by the tool pot 174 of the magazine arm 173. In this respect, the pair of supporting claws 204b and the support portion 205b of the ATC gripper 203b have shapes corresponding to the angles and postures of the notch grooves on the four adjacent sides on the outer circumferential surface of the CAPTO tool 1b held by the tool pot of the magazine arm 173 on the pivoting track at the position pivoted by 45 degrees from the center position. This ensures that the tool 1b held by the tool pot 174 on the distal end of the magazine arm 173 is transferred to the ATC gripper 203b only by the horizontal movement of the ATC carrier. This eliminates the need for a complicated mechanism nor control dedicated to changing the angle and posture (phase) of the tool 1b in the transfer of the tool 1b from the gripper plate 150, which stores the tool 1b, to the ATC arm 202 of the automatic tool changer (ATC) area 200. This facilitates the control of the tool transfer operation.

Next, by referring to the drawings described above, description will be made with regard to operations performed when the BT tool 1a stored in the rack area 100 is attached to the spindle 20 using the tool magazine 10 according to the embodiment of the present invention. First, with the tool pot 174 holding no tool 1a, the controller places the magazine arm 173 of the tool holding device 170 at the center position (see reference character A in FIG. 4), and drives the vertical movement mechanism (see 181 in FIG. 1) and the horizontal movement mechanism (see 191 in FIG. 1) to move the tool holding device 170 to a predetermined height and position. Then, the controller pivots the magazine arm 173 to the right pivoting position (see reference character B in FIG. 4) or the left pivoting position (see reference character C in FIG. 4) to place the tool pot 174 directly above the tool 1a held in a suspended manner by the gripper 151 of the gripper plate 150. In this state, the vertical movement mechanism lowers the tool holding device 170 to hold the taper portion of the tool 1a using the tool pot 174.

After the tool pot 174 has held the tool, the controller pivots the magazine arm 173 to the center position to remove the tool 1a from the gripper 151, so that the tool 1a is held in a suspended manner.

Then, the controller drives the vertical movement mechanism and the horizontal movement mechanism again to move the tool holding device 170 to a predetermined height and position adjacent to the ATC area 200. Then, a movement mechanism, not shown, horizontally moves the ATC carrier (see 207 in FIG. 1) to the position where the tool pot 174 is holding the tool 1a in a suspended manner, and the ATC gripper 203a disposed on one end of the ATC arm 202 on the ATC carrier 207 holds the V groove portion of the tool 1a from the side (see FIG. 7). In this state, the controller releases the holding of the tool 1a by the tool pot 174, and raises the tool holding device 170, thereby finishes transferring the tool 1a from the tool pot 174 to the ATC gripper 203a. Then, the ATC carrier 207 horizontally moves to an ATC position at which automatic tool change is performed with respect to the spindle 20. At the same time, the ATC arm 202 rotates by 180 degrees to transfer the held tool 1a to the spindle side and attach the tool 1a to the spindle 20.

An example of the transfer operation of the tool a from the tool pot 174 of the magazine arm 173 to the ATC gripper 203a has been described as the operation in which the ATC carrier 207 moves to cause the ATC gripper 203a to approach the tool 1a from the side with the magazine arm 173 located at the center position. This, however, should not be construed in a limiting sense. Another possible example of the transfer operation is to locate the ATC carrier 207 (the ATC gripper 203a) at a predetermined position, to slightly pivot the magazine arm 173 from the center position, to adjust the height position of the magazine arm 173, and to pivot the magazine arm 173 to the center position to push the tool 1a from the side into the ATC gripper 203a. In the case of the transfer operation of the CAPTO tool 1b, the magazine arm may be controlled as shown in FIG. 8, for the tool to be transferred from the tool pot 174 to the ATC gripper 203b at the position where the magazine arm is pivoted from the center position by 45 degrees.

In the transfer operation of the tool to the ATC carrier, the pivoting position of the magazine arm is the center position in one example and a position pivoted by 45 degrees in another example. These two examples, however, should not be construed as limiting the tool transfer operation according to the embodiment of the present invention. A possible modification is to property change the shape of the tool holding member of the tool pot and the shapes of the gripper and the key disposed on the gripper plate according to the embodiment of the present invention in accordance with the shape of a tool to be stored. This makes the present invention applicable to various other tools than the tools described herein. In the case of an automatic tool change operation using the tool magazine according to the embodiment of the present invention, it is possible to property change the shapes of the ATC gripper and the support portion in accordance with the shape of a replacement tool. At the same time, it is possible to perform a control operation of property changing the pivoting position of the magazine arm and the transfer position of the ATC gripper. This makes the automatic change operation applicable to various other tools than described herein.

In one embodiment of the tool magazine according to the embodiment of the present invention, the gripper plate may be disposed as a pair facing each other across the magazine arm.

In another embodiment of the tool magazine, the gripper plate may be disposed in plurality in the longitudinal direction, and the magazine arm may be movable in the longitudinal direction. In another embodiment of the tool magazine, the gripper plate may be disposed in plurality in a vertical direction of the tool magazine, and the magazine arm may be movable in the vertical direction. Furthermore, the gripper plate may be attached in a height-adjustable manner in a vertical direction of the tool magazine.

In another embodiment of the tool magazine, the gripper may include an elastic member on at least one distal end of the gripper.

The elastic member may include a leaf spring including a fixed end on the at least one distal end of the gripper. The leaf spring may include a free end on the other end of the leaf spring. The leaf spring may include a protrusion portion on the free end to protrude toward a side on which the gripper is open. Furthermore, the gripper may include a key in a center of the gripper.

In another embodiment of the tool magazine, the tool magazine may further include an ATC carrier, an ATC arm, and ATC grippers. The ATC carrier is movable on a horizontal plane. The ATC arm has an axis of rotation on the ATC carrier and is configured to rotate horizontally about the axis. The ATC grippers are disposed on both ends in a longitudinal direction of the ATC arm. A controller to control components of the tool magazine drives the ATC carrier and the ATC arm so as to control a position of the ATC gripper, and the controller drives a mechanism of moving the magazine arm in the longitudinal direction or the vertical direction of the gripper plate and a mechanism of pivoting the magazine arm to make the tool held by the tool pot move to the position of the ATC gripper, so as to transfer the tool from the tool pot to the ATC gripper. The controller may include a function to change the position of the ATC gripper on a pivoting track of the magazine arm in accordance with a shape of the tool.

The machine tool according to the embodiment of the present invention thus configured eliminates the need for providing the tool pot for the magazine arm with a configuration to maintain the angle and posture of a tool while the magazine arm is pivoting. Thus, only a simple mechanism to hold a tool is necessary in the tool pot, resulting in a simplified configuration.

The machine tool according to the embodiment of the present invention also ensures that a tool can be transferred between the tool pot and the gripper only by a pivoting operation of the magazine arm. This facilitates control of the tool transfer operation.

With the tool being transferred by a pivoting operation, it is not necessary to provide as much working space as required in another tool magazine equipped with a movement mechanism in a horizontal direction toward a gripper plate. Also, gripper plates are disposed on both sides of the magazine arm and facing each other across the magazine arm. This minimizes the width dimension of the tool magazine although a large number of tools can be stored.

The machine tool according to the embodiment of the present invention also ensures that the height of each gripper plate is adjustable independently, making the distance between the gripper plates adjustable in accordance with the tool length. In view of this, storing short-length tools in the tool magazine in a focused manner at one place makes the number of stages formed by the gripper plates increase and results in increasing the number of tools that can be stored. This ensures effective utilization of the limited space of the rack area.

Additionally, a plurality of gripper plates are provided in the horizontal direction, and this ensures that the section in which the gripper plate height is adjustable in accordance with the tool length can be divided into a number of sections. This leads to an increased number of sections in which tools can be stored, resulting in more effective utilization of the space of the rack area.

The machine tool according to the embodiment of the present invention also ensures that the pivoting angle of the magazine arm and the tool transfer position of the ATC carrier can be changed by changing a control command from the controller. This ensures that an identical mechanism can be used to accommodate to tools with various specifications merely by changing the shape of the gripping portion of a tool.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A tool magazine comprising:
    a magazine arm comprising:
        a pivotal axis on one end of the magazine arm; and
        a tool pot on another end of the magazine arm, the tool pot being configured to hold a tool in a suspended manner with the tool having a longitudinal axis extending in an extending direction such that the tool pivots around the pivotal axis on a circular arc track when the magazine arm pivots around the pivotal axis; and
    a gripper plate on which a plurality of grippers are disposed in a longitudinal direction of the tool magazine, at least one of the plurality of grippers being configured to hold the tool in a suspended manner at a holding position on the circular arc track such that the extending direction of the longitudinal axis of the tool is substantially aligned with a vertical direction of the tool magazine, the at least one gripper having a U-shape when viewed in a direction parallel to the pivotal axis, the U-shape having two parallel sides, an open end, and a closed end, the at least one gripper having a central line that extends parallel to the two parallel sides from the closed end to the open end, the central line being tangent to the circular arc track at the holding position on the circular arc track when the tool is being inserted into the at least one gripper along the circular arc track.

2. The tool magazine according to claim 1, further comprising:
    a first additional gripper plate provided to be opposite to the at least one of the plurality of grippers with respect to the magazine arm.

3. The tool magazine according to claim 2, further comprising:
    a second additional gripper plate,
    wherein the gripper plate and the second additional gripper plate are disposed in the longitudinal direction, and
    wherein the magazine arm is movable in the longitudinal direction.

4. The tool magazine according to claim 2, further comprising:
    a third additional gripper plate,
    wherein the gripper plate and the third additional gripper plate are disposed in the vertical direction of the tool magazine, and
    wherein the magazine arm is movable in the vertical direction.

5. The tool magazine according to claim 1, further comprising:
    a second additional gripper plate,
    wherein the gripper plate and the second additional gripper plate are disposed in the longitudinal direction, and
    wherein the magazine arm is movable in the longitudinal direction.

6. The tool magazine according to claim 5, further comprising:
    a third additional gripper plate,
    wherein the gripper plate and the third additional gripper plate are disposed in the vertical direction of the tool magazine, and
    wherein the magazine arm is movable in the vertical direction.

7. The tool magazine according to claim 1, further comprising:
    a third additional gripper plate,
    wherein the gripper plate and the third additional gripper plate are disposed in the vertical direction of the tool magazine, and
    wherein the magazine arm is movable in the vertical direction.

8. The tool magazine according to claim 7, wherein the gripper plate is attached in a height-adjustable manner in the vertical direction of the tool magazine.

9. The tool magazine according to claim 1, wherein the gripper plate is attached in a height-adjustable manner in the vertical direction of the tool magazine.

10. The tool magazine according to claim 1, wherein the at least one of the plurality of grippers comprises an elastic member on at least one distal end of the at least one of the plurality of grippers.

11. The tool magazine according to claim 10,
    wherein the elastic member comprises a leaf spring comprising a fixed end and a free end, the fixed end being on the at least one distal end of the at least one of the plurality of grippers, and
    wherein the leaf spring comprises a protrusion portion on the free end to protrude toward a side on which the at least one of the plurality of grippers is open.

12. The tool magazine according to claim 10, wherein the at least one of the plurality of grippers comprises a key in a center of the closed end of the at least one of the plurality of grippers.

13. The tool magazine according to claim 1, further comprising:
    an automatic tool changer carrier movable on a horizontal plane;
    an automatic tool changer arm configured to rotate horizontally about a rotation center on the automatic tool changer carrier; and
    automatic tool changer grippers disposed on both ends in a longitudinal direction of the automatic tool changer arm,
    wherein a controller to control a movement of a component of the tool magazine drives the automatic tool changer carrier and the automatic tool changer arm so as to control a position of one of the automatic tool changer grippers on a magazine arm side, and drives a mechanism of moving the magazine arm in the longitudinal direction or the vertical direction of the tool magazine and a mechanism of pivoting the magazine arm so as to transfer the tool to the position of the one of the automatic tool changer grippers on the magazine arm side.

14. The tool magazine according to claim 13, wherein the controller comprises a function to change the position of the one of the automatic tool changer grippers on the magazine arm side on a pivoting track of the magazine arm in accordance with a shape of the tool.

15. The tool magazine according to claim 1,
wherein the at least one of the plurality of grippers includes a key, and
wherein the key extends in the tangent direction to engage with a key groove of the tool.

16. The tool magazine according to claim 1, wherein the holding position substantially coincides with a center of the tool held by the at least one of the plurality of grippers.

17. A tool magazine comprising:
a magazine arm which has a tool pot to hold a tool in a suspended manner with the tool having a longitudinal axis extending in an extending direction, the magazine arm being pivotable around a pivotal axis such that the tool pivots around the pivotal axis along a circular arc track; and
a gripper plate having at least one gripper configured to hold the tool in a suspended manner at a holding position on the circular arc track such that the extending direction of the longitudinal axis of the tool is substantially aligned with a vertical direction of the tool magazine, the at least one gripper having a U-shape when viewed in a direction parallel to the pivotal axis, the U-shape having two parallel sides, an open end, and a closed end, the at least one gripper having a central line that extends parallel to the two parallel sides from the closed end to the open end, the central line being tangent to the circular arc track at the holding position on the circular arc track when the tool is being inserted into the at least one gripper along the circular arc track.

18. The tool magazine according to claim 17,
wherein the at least one gripper includes a key, and
the key extends in the tangent direction to engage with a key groove of the tool.

19. The tool magazine according to claim 17, wherein the holding position substantially coincides with a center of the tool held by the at least one gripper.

20. A tool magazine comprising:
a magazine arm which has a tool pot to hold a tool in a suspended manner with the tool having a longitudinal axis extending in an extending direction, the magazine arm being pivotable around a pivotal axis such that the tool pivots around the pivotal axis along a circular arc track; and
a gripper plate having at least one gripper with opposing first and second side walls, and an opening to hold the tool in a suspended manner in the opening at a holding position on the circular arc track such that the extending direction of the longitudinal axis of the tool is substantially aligned with a vertical direction of the tool magazine, the circular arc track extending in a plane perpendicular to the pivotal axis, the opening having a central line that extends in a direction parallel to the plane, the central line being tangent to the circular arc track at the holding position on the circular arc track, the central line extending from a closed end of the at least one gripper through a central portion of an open end of the at least one gripper, the open end being configured to allow the tool to move therethrough when the tool is being inserted into the at least one gripper along the circular arc track,
wherein the opposing first and second walls each have a longitudinal axis that is oblique to a longitudinal axis of the gripper plate.

21. The tool magazine according to claim 20,
wherein the at least one gripper further has a bottom wall, which connects the first side wall and the second side wall so as to define the opening of the at least one gripper when viewed from a direction of the pivotal axis, and
wherein the central line passes through a center of the opening of the at least one gripper and is substantially perpendicular to the bottom wall of the at least one gripper when viewed from the direction of the pivotal axis.

22. The tool magazine according to claim 20,
wherein the at least one gripper includes a key, and
the key extends in the tangent direction to engage with a key groove of the tool.

23. The tool magazine according to claim 20, wherein the holding position substantially coincides with a center of the tool held by the opening of the at least one gripper.

* * * * *